March 11, 1947.  W. M. McMAINS  2,417,317
INSTRUCTION COVER FOR AIRPLANE WINDOWS
Filed Jan. 29, 1945  2 Sheets-Sheet 1
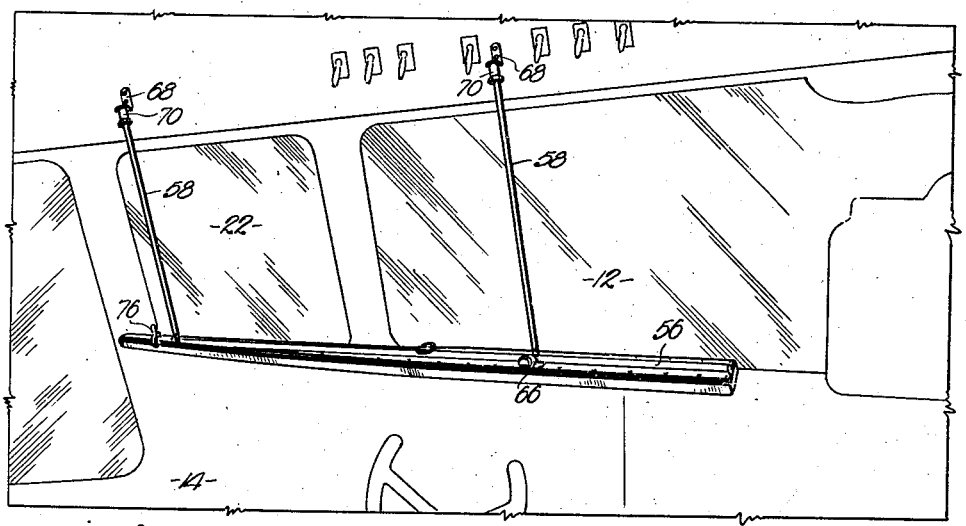
Fig. 1.
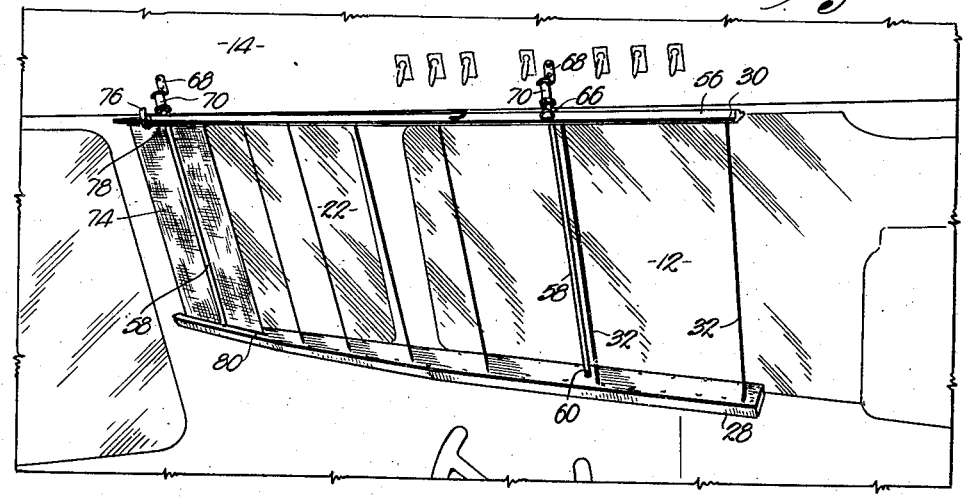
Fig. 2.
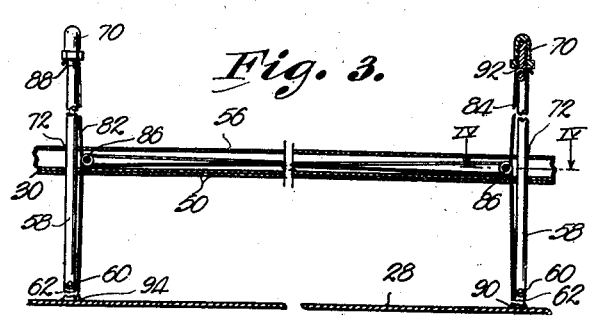
Fig. 3.
Fig. 4.
INVENTOR.
Wren M. McMains
BY
ATTORNEY.

March 11, 1947.  W. M. McMAINS  2,417,317
INSTRUCTION COVER FOR AIRPLANE WINDOWS
Filed Jan. 29, 1945  2 Sheets-Sheet 2
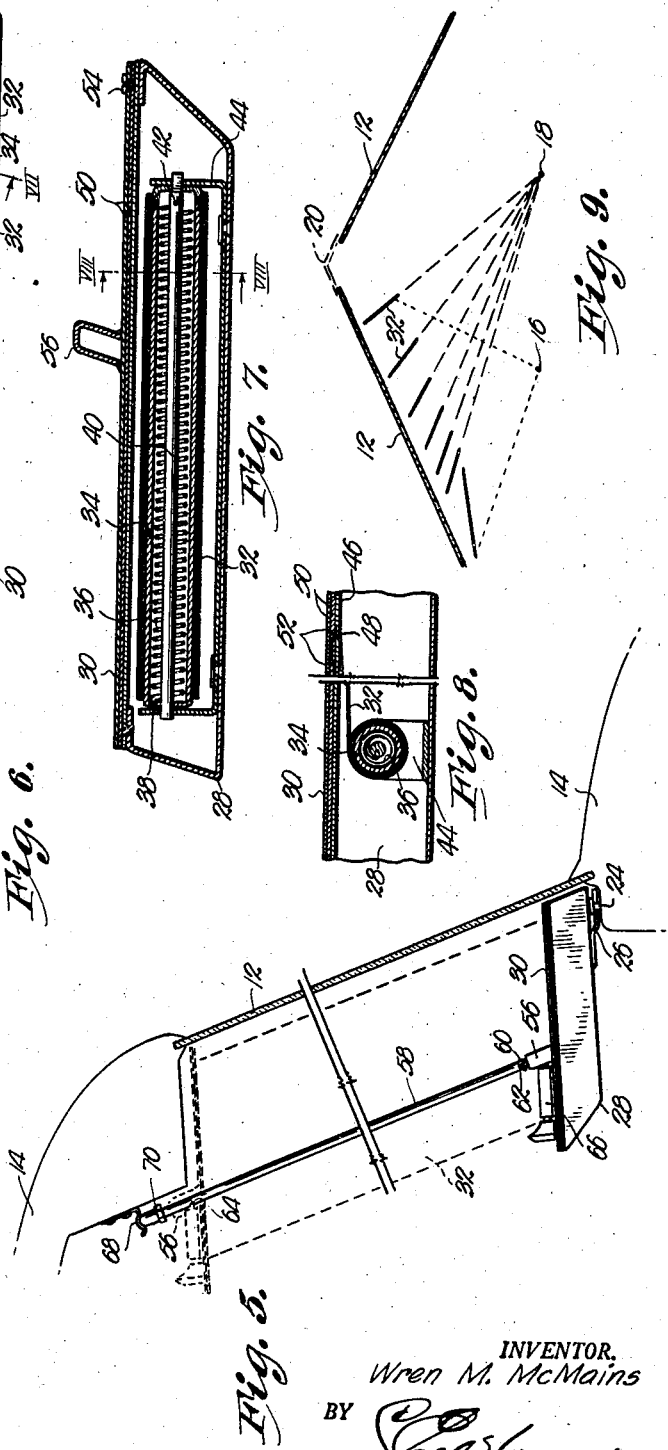
INVENTOR.
Wren M. McMains
BY
ATTORNEY.

Patented Mar. 11, 1947

2,417,317

UNITED STATES PATENT OFFICE 2,417,317

INSTRUCTION COVER FOR AIRPLANE WINDOWS

Wren Meyer McMains, Richmond, Ind.

Application January 29, 1945, Serial No. 575,149

9 Claims. (Cl. 244—121)

This invention relates to the art of teaching blind flying, or piloting an airplane through the employment of instruments, and the primary aim is to provide means for obscuring the view of the student through the window of the airplane while the instructor is afforded an unobstructed view through said window.

One of the important aims of the instant invention is to provide an instruction cover for airplane windows, the character whereof permits of quick manipulation to and from the operative position; allows clear, unobstructed view from one of the two side-by-side seats of the aircraft while the view through the window from the other of said seats is almost completely obstructed; and is capable of being collapsed to an inoperative condition with a minimum amount of effort.

This invention has for another object to provide a window cover for airplanes that is attachable to the pilot's or co-pilot's windshield in such fashion as to occupy a minimum amount of space when the same is in a collapsed condition, and that is shiftable with ease and dispatch to an extended condition where the specially disposed strips thereof will serve to fulfill the aforesaid primary aims.

Other objects of the invention include the particular manner in which the window cover is made; the form of many of its component parts; and the effective way in which the same is combined with the pilot's and/or co-pilot's windows of the aircraft.

In the drawings:

Fig. 1 is an elevational view of the instruction cover showing the same in a collapsed or inoperative position but attached to the windshield of an airplane.

Fig. 2 is a similar view illustrating the window cover in the operative position and viewing the same from the instructor's seat.

Fig. 3 is a fragmentary condensed sectional view through the cover showing the cable arrangement.

Fig. 4 is a fragmentary detailed sectional view taken on line IV—IV of Fig. 3.

Fig. 5 is a vertical sectional view through a portion of the airplane windshield illustrating the cover in both the collapsed and extended condition, the latter condition being illustrated in dotted lines.

Fig. 6 is a top plan view of the collapsed window cover with parts broken away for purpose of revealing the manner of disposing the strips.

Fig. 7 is an enlarged vertical cross sectional view taken on line VII—VII of Fig. 6.

Fig. 8 is a fragmentary sectional view taken on line VIII—VIII of Fig. 7.

Fig. 9 is a schematic view illustrating the relation between the inclined strips of the window cover and the two side-by-side seats of the airplane; and Fig. 10 is an enlarged fragmentary sectional view taken on line X—X of Fig. 6.

In the embodiment of the invention chosen for illustration, the cover assembly has been shown associated with a commercial type airplane now conventionally used. The cover is shown mounted near one windshield or window 12 of the airplane, a fragment whereof is shown in Figs. 1, 2 and 5 and designated by the numeral 14. It is customary to provide airplanes 14 with a pair of windows 12 in front of points 16 and 18 where the student and instructor respectively, are seated. These points also are employed by the pilot and co-pilot under normal conditions. In using airplane 14 as means for training a student, however, the instructor sits at point 18 while the student occupies the seat at point 16—all to the end that the student may not see through the adjacent window 12 while the instructor is afforded unobstructed view.

In the type of airplane illustrated, windows 12 diverge from a point 20 on the longitudinal center line of the airplane 14, and in addition to being rearwardly converging the said windows 12 are inclined toward each other as their upper edges are approached—thus, the angle of inclination illustrated in Fig. 5, is substantially that assumed by windows 12.

Main windshields or windows 12 are fixed to the frame or fuselage of airplane 14, but in order to meet certain conditions where the pilot must lean out his compartment to view the ground when landing is occurring, under peculiar weather conditions, a slidable, smaller window 22 is built into the airplane 14. This window 22 is usually behind the main windshields 14. As will be hereinafter set forth, the cover assembly has an auxiliary strip independently movable to permit the use of this window 22.

The cover assembly per se may be bodily moved to and from an operative position adjacent to either of the two windshields or windows 12 by the simple addition of headed studs 24 mounted upon the sill formed by a portion of the airplane 14, as illustrated in Fig. 5. There may be any number of studs 24 and each receives a fixture 26 carried by one of the members 28 that cooperates with another member 30 in holding a plurality of flexible strips 32 in position.

Member 28 may be designated as the lower member of the assembly and is hollow in form, as clearly shown in Fig. 7, to accommodate a number of spring loaded rollers 34, each of which has a retrieving coil spring 36 therein, one end of which is anchored as at 38 to the end of roller 34, while the opposite end of spring 36 is attached to shaft 40 as at 42. This shaft 40 is supported by a bracket 44 rigid to member 28 and formed to confine roller 34 to limit its longitudinal movement with respect to shaft 40.

The top plate 46 of member 28 has a number of slots 48 inclined with respect to each other, and also with relation to the longitudinal axes of rollers 34.

One end of strips 32 are secured to their respective rollers 40, while the other ends of these said strips 32 are clamped to member 30, as shown in Fig. 8.

Member 30 comprises a pair of superimposed plates 50, one of which has a pair of slots 52 formed therethrough. The marginal end of each strip 32 is threaded upwardly through one slot 52, thence downwardly through the companion slot to expose an area between the two plates 50. Because these plates 50 are secured together by any suitable means, such as machine screws 54, the clamped ends of strips 32 will be held in place.

A longitudinal rib 56 mounted upon the upper member 30 imparts rigidity thereto and presents a way through which the hereinafter described cables may pass.

A pair of support rods 58 hingedly mounted as at 60 to the upper end of pintles 62, afford means for holding the upper member 30 in an operative position, illustrated in Fig. 2, and by the dotted line position shown in Fig. 5. One of rods 58 has a notch or detent 64 to be engaged by a latch 66 carried by upper member 30—thus, when the strips 32 are extended, members 28 and 30 are held apart by rods 58 and particularly the latch 66 engaging one of said rods.

Small spring detents 68 carried above windows 12 frictionally engage the upper ends of rods 58, each of which has an adjustable head 70 thereon. In fitting the cover assembly to either of windows 12 or any analogous windshield or window in any airplane, heads 70 will allow necessary adjustment of the length of rods 58 and fixture 26 is so slotted as to permit adequate adjustment with respect to the stud 24—all to the end that ease of fitting is present.

Pintles 62 are long enough to pass upwardly through openings 72 when upper member 30 is against the top of lower member 28—thus, both rods 58 may be swung down to the positions shown in Fig. 5 when the cover is not in use.

It is important that rib 56 be mounted upon upper member 30 in an inclined manner, as illustrated in Figs. 5 and 7. This angle of inclination must be substantially the same as the angle of disposition of the associated windshield 12 to the end that the edges of strips 32 will parallel window 12. This angle is maintained by mounting rollers 34 in member 28, as illustrated in Fig. 6. The longitudinal axis of each roller 34 is not parallel to the companion slot 48 but inclined with respect to said slot to not only prevent uneven take-up by the roller 34, but to insure that each strip 32 will have its edges substantially parallel to window 12 and out of perpendicular as regards upper and lower members 30 and 28 respectively.

Strips 32 are on radial lines extending from point 18 and said strips are progressively closer together as point 16 is approached. So positioning the series of strips 32 will definitely preclude the student seated at point 16 from seeing through window 12. The instructor will have a clear vision however, from point 18 and only the inner edges of strips 32 will be seen as he looks through window 12.

The assembly illustrated in Fig. 2 is as viewed by the instructor when at point 18. When it becomes necessary to slide window 22 forwardly and view the ground with strips 32 in place, as would be the case in event of landing with the windows covered or coated with ice, curtain 74 is lowered by releasing latch 76, shown in Fig. 10. The upper end of curtain 74 has a strip 78 thereon while the lower end of this said curtain is wound upon a roller of the same construction as roller 34 shown in Fig. 7. The curtain extends through a slot 80 in the upper wall of lower member 28 and thus, this said auxiliary or supplemental curtain may be quickly lowered to afford access to window 22 without collapsing the remaining portion of the cover assembly.

To prevent binding when upper member 30 is lifted, after rods 58 are raised to the position shown in Fig. 1, the assembly includes a pair of cables 82 and 84. Two side-by-side sheave wheels 86 are arranged within rib 56 near each set of openings 72 and the cables are passed thereover in the following manner:

Cable 82, anchored at its one end as at 88 to one rod 58, extends into rib 56 through an appropriate perforation, around one of sheaves 86 and thence through rib 56 to one of sheaves 86 near the other rod 58, from whence it passes downwardly to a point of anchorage 90 on lower member 28. The other cable 84 is secured as at 92 to the upper end of rod 58 and extends downwardly into rib 56 around one of sheaves 86, thence through rib 56 and over one of the two sheaves 86 near the opposite rod 58 from whence it extends downwardly to a point of anchorage 94 on lower member 28. Cables 82 and 84 pass over sheaves 86 as clearly shown in Fig. 3, to serve as means for maintaining the lower and upper members 28 and 30 respectively, in parallelism as the same are parted or moved from each other along rods 58 to extend strips 32. When the cover assembly is being manipulated to the operative condition, curtain 74 is separately actuated after upper member 30 has been lifted and held in place by latch 66.

The rigid parts of the cover for airplane windows should be formed of plastic or light metal such as aluminum, to reduce weight, and since the strips 32 do not extend to the normally rear end of upper and lower members 28 and 30, these said members should be reduced in width as illustrated in Fig. 6, to minimize the amount of room occupied within the control compartment of the aircraft.

Obviously, cover assemblies for airplane windows having physical characteristics different from those illustrated and described, might be made without departing from the spirit of the invention or scope of the appended claims.

Having thus described the invention, what is claimed as new and desired to be secured by Letters Patent is:

1. A cover assembly for the windows of airplanes used for pilot training comprising a plurality of substantially vertically disposed flexible strips; a member common to all of said strips and secured to one end of each; a second member receiving the other ends of the strips; and means for collapsing the strips as said members are relatively moved one toward the other.

2. A cover assembly for the windows of airplanes used for pilot training comprising a plurality of substantially vertically disposed flexible strips; a member common to all of said strips and secured to one end of each; a second member receiving the other ends of the strips; and spring loaded rollers housed within one of said members for winding each strip respectively as the members are relatively moved one toward the other.

3. A cover assembly for the windows of airplanes used for pilot training comprising a plurality of substantially vertically disposed flexible strips; a member common to all of said strips and secured to one end of each; a second member receiving the other ends of the strips; spring loaded rollers housed within one of said members for winding each strip respectively as the members are relatively moved one toward the other; and structure for maintaining the members substantially parallel to each other as they are moved toward and from each other.

4. A cover assembly for the windows of airplanes used for pilot training comprising a plurality of substantially vertically disposed flexible strips; a member common to all of said strips and secured to one end of each; a second member receiving the other ends of the strips; spring loaded rollers housed within one of said members for winding each strip respectively as the members are relatively moved one toward the other; and rods for holding the two members apart with the strips stretched therebetween.

5. A cover assembly for the windows of airplanes used for pilot training comprising a plurality of substantially vertically disposed flexible strips; a member common to all of said strips and secured to one end of each; a second member receiving the other ends of the strips; spring loaded rollers housed within one of said members for winding each strip respectively as the members are relatively moved one toward the other; and rods for holding the two members apart with the strips stretched therebetween; and structure for maintaining the members substantially parallel to each other as the same are moved toward and from each other.

6. A cover assembly for the windows of airplanes used for pilot training comprising a plurality of substantially vertically disposed flexible strips; a member common to all of said strips and secured to one end of each; a second member receiving the other ends of the strips; spring loaded rollers housed within one of said members for winding each strip respectively as the members are relatively moved one toward the other; and rods for holding the two members apart with the strips stretched therebetween, said rods being hingedly secured to the member having the said rollers therein for movement against the members when the same are, together with the strips, wound on the rollers.

7. A cover assembly for the windows of airplanes used for pilot training comprising a plurality of substantially vertically disposed flexible strips; a member common to all of said strips and secured to one end of each; a second member receiving the other ends of the strips; and spring loaded rollers housed within one of said members for winding each strip respectively as the members are relatively moved one toward the other, said one member having the rollers therein being provided with slots through which the strips extend to their respective rollers.

8. A cover assembly for the windows of airplanes used for pilot training comprising a plurality of substantially vertically disposed flexible strips; a member common to all of said strips and secured to one end of each; a second member receiving the other ends of the strips; and spring loaded rollers housed within one of said members for winding each strip respectively as the members are relatively moved one toward the other, said one member having the rollers therein being provided with slots through which the strips extend to their respective rollers, said slots and said rollers being arranged in pairs, the slot and roller of each pair being at an angle to each other.

9. A cover assembly for the windows of airplanes used for pilot training comprising a plurality of substantially vertically disposed flexible strips; a member common to all of said strips and secured to one end of each; a second member receiving the other ends of the strips; and spring loaded rollers housed within one of said members for winding each strip respectively as the members are relatively moved one toward the other, said one member having the rollers therein being provided with slots through which the strips extend to their respective rollers, said slots and said rollers being arranged in pairs, the slot and roller of each pair being at an angle to each other, said strips being progressively closer together as one end of the assembly is approached.

WREN MEYER McMAINS.

REFERENCES CITED

The following references are of record in the file of this patent:

UNITED STATES PATENTS

| Number | Name | Date |
|---|---|---|
| 1,833,970 | Levick | Dec. 1, 1931 |
| 2,322,770 | Ocker | June 29, 1943 |
| 2,090,132 | La Coe | Aug. 17, 1937 |

OTHER REFERENCES

St. Louis Post-Dispatch, June 8, 1941, pages 1E and 3E. (Div. 53.)

Washington Post, Sunday, April 7, 1940. (Clipping in 35–12.)

Popular Mechanics, page 59, Nov., 1943. (Photostats in 35–12.)

Christian Science Monitor, Sept. 23, 1942. (Clipping in 35–12.)

Any well known Venetian blinds as those at 1309 Locust Road, Washington, D. C.